(12) United States Patent  
Tanksley et al.

(10) Patent No.: US 6,929,100 B2  
(45) Date of Patent: Aug. 16, 2005

(54) WHEELCHAIR WHEEL LOCK

(75) Inventors: Keith A. Tanksley, Nicholasville, KY (US); Bruce S. Donaldson, Lexington, KY (US)

(73) Assignee: Lawrence-Nelson, LLC, Lexington, KY (US)

( * ) Notice: Subject to any disclaimer, the term of this patent is extended or adjusted under 35 U.S.C. 154(b) by 0 days.

(21) Appl. No.: 10/328,780

(22) Filed: Dec. 23, 2002

(65) Prior Publication Data

US 2003/0116387 A1 Jun. 26, 2003

Related U.S. Application Data

(60) Provisional application No. 60/344,612, filed on Dec. 26, 2001, and provisional application No. 60/409,461, filed on Sep. 10, 2002.

(51) Int. Cl.[7] .................................................. B60T 1/04
(52) U.S. Cl. ........................ 188/2 F; 280/250.1; 188/20
(58) Field of Search ................................. 188/2 F, 2 D; 280/250.1, 242.1, 304.1, 648, 650

(56) References Cited

U.S. PATENT DOCUMENTS

| | | | |
|---|---|---|---|
| 4,204,588 A | 5/1980 | Kawecki | |
| 4,809,818 A | * 3/1989 | Leggett et al. | ............... 188/2 F |
| 5,141,242 A | 8/1992 | Henzel | |
| 5,145,197 A | 9/1992 | Gatti | |
| 5,174,418 A | 12/1992 | Le et al. | |
| 5,280,938 A | 1/1994 | Berry | |
| 5,346,039 A | 9/1994 | Pfisterer | |
| 5,358,266 A | 10/1994 | Roth et al. | |
| 5,472,066 A | 12/1995 | Schillo et al. | |
| 5,769,441 A | 6/1998 | Namngani | |
| 5,799,756 A | 9/1998 | Roberts et al. | |
| 5,865,455 A | 2/1999 | Taylor | |
| 5,941,547 A | 8/1999 | Drake | |
| 5,984,334 A | * 11/1999 | Dugas | ..................... 280/250.1 |
| 6,070,603 A | 6/2000 | Politz | |
| 6,092,822 A | 7/2000 | Salmon | |
| 6,279,934 B1 | 8/2001 | Womack | |
| 6,312,002 B1 | 11/2001 | Slagerman | |
| 6,315,085 B1 | 11/2001 | Dahlem | |
| 6,443,268 B1 | 9/2002 | Dearth et al. | |
| 6,578,860 B1 | * 6/2003 | Chang | ..................... 280/250.1 |

* cited by examiner

*Primary Examiner*—Matthew C. Graham  
(74) *Attorney, Agent, or Firm*—King & Schickli, PLLC

(57) ABSTRACT

A wheelchair wheel locking assembly comprises a first wheel stop having an actuating lever for operating a first wheel-engaging member. The first wheel stop is operably connected to a second wheel stop via a continuously flexible linkage, whereby actuating the first wheel stop simultaneously operates the second wheel stop. In the event the continuously flexible linkage is severed, the first wheel stop may continue to be operated by the actuating lever. The wheel locking assembly of this invention is advantageously operated from a single side of a wheelchair. A wheel locking assembly having dual actuating levers is also provided, whereby from a single side of a wheelchair a first actuating lever operates a first wheel-engaging member and a second actuating lever operates a second wheel-engaging member.

6 Claims, 4 Drawing Sheets

WHEELCHAIR WHEEL LOCK

This application claims the benefit of priority in U.S. Provisional Patent Application Ser. Nos. 60/344,612, filed Dec. 26, 2001, and 60/409,461, filed Sep. 10, 2002.

FIELD OF THE INVENTION

This invention relates generally to the field of wheel locking mechanisms for wheelchairs. In particular, the present invention relates to a wheelchair lock adapted for use by individuals suffering from greater weakness in one hemisphere of the body. The present invention relates further to an improved wheel-contacting surface for a wheel lock, providing enhanced stopping power without necessitating use of additional force.

BACKGROUND OF THE INVENTION

It is known to provide wheelchairs with mechanisms for locking the wheels thereof, preventing the wheelchairs from traveling except at the urging of the user. Standard wheelchair locks must be operated from both sides of the chair, that is, the left wheel must be locked from the left side, and the right wheel must be locked from the right side. However, often individuals requiring wheelchairs suffer from greater weakness in one side of the body than the other, such as for example stroke victims. Such persons must either reach across their body with the stronger arm and hand to operate the opposite wheel lock, or require assistance from another person.

There have been attempts to address this deficiency of conventional wheel locks. For example, U.S. Pat. No. 4,809,818 to Leggett et al. provides a dual braking structure consisting of a rod 14 attached to a first wheel lock or brake, a center section 46, and a left rod 24 attached to a second wheel lock. Thus, both brakes may be operated by actuating either brake. Center section 46 allows left and right rods 14, 24 to be folded relative to one another when the wheelchair is folded.

U.S. Pat. No. 6,443,268 to Dearth et al. provides a similar assembly for linking operation of two wheelchair locks or brakes. A crossmember 38 comprising paired segments 42 pivotally coupled at their interior ends is connected to paired wheelchair brakes at the exterior ends of paired segments 42. Accordingly, operation of both wheelchair brakes may be accomplished by actuating either brake. Because of the central pivoting coupling, crossmember 38 may be folded when the wheelchair is folded.

These devices appear generally effective for their intended purpose. However, significant improvements are possible. Use of a bar or rod to link paired wheelchair brakes or wheel locks adds weight to the chair, particularly when a sufficiently thick material is used to prevent the twisting or torsion inherent in applying a force to a single end of a bar or rod. Particularly in the case of a weakened user of the chair, any savings in weight is advantageous in terms of user comfort and convenience. This extends to the comfort and convenience of persons assisting the wheelchair user.

The stopping power of a conventional wheel lock or wheel strike is provided by frictional force. Therefore, to be effective a wheel lock must contact a wheelchair wheel with the required amount of force to substantially prevent rotation thereof. This force is provided in response to an actuating force provided by the user. In order to increase stopping power, a conventional wheel lock must be caused to engage the wheelchair wheel with increased force. Because the wheelchair user is often relatively weakened, application of additional force may be difficult. Further, materials from which wheelchair parts such as wheelchair locks are constructed have a finite strength and resistance to shear forces, and in extreme conditions may break in response to the applied force. It is therefore desirable to find means for improving the stopping capability of a wheel lock without necessitating application of increased force.

Therefore, a need in the art exists for a wheel locking mechanism which is easy to operate for persons with partial or total immobility or weakness in one side of their body. Such a wheel locking mechanism should preferably be adaptable for affixation or retrofitting to any standard wheelchair design.

SUMMARY OF THE INVENTION

It is known to provide a wheelchair for transporting fully or partially disabled persons, having a frame, a seat and back supported on the frame, and at least two primary drive wheels. When the wheelchair is at rest, it is often desirable to lock the wheels thereof to prevent inadvertent travel of the chair, either with or without an occupant. For example, when a disabled person is exiting or entering the chair, such as to or from a bed, the wheelchair wheels must be locked to provide a secure platform for the user. Accordingly, in one aspect, the present invention provides a wheel locking assembly for substantially preventing rotation of a wheelchair wheel or tire about its axis. Advantageously, the wheel locking assembly of the invention allows the user to lock both wheels of the wheelchair from a single side of the chair, rather than requiring the user to access separate locking mechanisms on opposed sides of the chair as is necessary in conventional wheelchair wheel lock designs. It will be appreciated that this feature provides significant advantages for users having a increased weakness in a particular hemisphere of the body, such as is common for stroke victims.

The wheel locking assembly of the invention comprises a first wheel stop and a second wheel stop for mounting to opposite sides of a wheelchair frame of conventional design, in such a manner that the wheel stops may access the wheelchair wheels to prevent rotation thereof. The first wheel stop may comprise a mounting bracket for attaching the wheel stop to the wheelchair frame, a first displaceable wheel-engaging member, and an actuating lever operably connected to the first displaceable wheel-engaging member.

The second wheel stop may comprise a mounting bracket and a second displaceable wheel-engaging member. The second displaceable wheel-engaging member is operably connected to the first wheel-engaging member by a substantially continuously flexible linkage. It will be appreciated that in this manner, biasing the actuating lever in a first direction pivots the first wheel-engaging member into contact with a first wheel or tire of the wheelchair and concurrently pivots the second wheel-engaging member into contact with a second, opposed wheel or tire. Of course, biasing the actuating lever in a second, opposed direction concurrently pivots the first and second wheel-engaging members away from contact with the wheelchair wheels.

Advantageously, the wheel locking assembly of this invention allows the actuating lever to remain operably connected to the first wheel-engaging member regardless of whether the second wheel stop is functional. For example, as will be described in greater detail below, if the continuously flexible linkage operably connecting the first and second wheel-engaging members is severed, the user may continue to lock at least one wheel of the wheelchair to prevent rotation thereof, thereby allowing continued use of the chair.

Conventional wheelchair wheels include a ground-engaging portion, typically fabricated of a resilient material such as rubber. To be effective for their intended purpose, wheelchair wheel locks must contact this ground-engaging portion with sufficient force to prevent rotation of the wheel or tire. This usually causes the wheel-contacting surface of the wheel-engaging member to partially indent the ground-engaging portion, thereby reducing the likelihood of rotation. However, with conventional wheelchair wheel locks there is still a possibility of slippage.

To address this problem, the wheel-engaging member of the present invention includes a wheel-contacting surface having a cutout for grippingly engaging the wheel or tire. The wheel-contacting surface of the present invention partially indents the resilient ground-engaging portion of a wheelchair wheel. Additionally, as the wheel-contacting surface is biased against the ground-engaging portion of the wheel with the desired force, a portion of the resilient material of the ground-engaging portion protrudes into the cutout, thereby significantly improving the stopping or gripping force on the wheel compared to a conventional wheel lock. The cutout may be of any dimensions suitable for providing a space into which the wheel ground-engaging surface may protrude. Typically, the wheel-contacting surface cutout is substantially concave.

The substantially continuously flexible linkage operably connecting the first and second wheel-engaging members typically comprises a flexible member having a first end operably connected to the first wheel-engaging member, and a second end operably connected to the second wheel-engaging member. The continuously flexible linkage may be any suitably flexible member capable of both pulling the wheel-engaging members into contact with a wheel and of pushing the wheel-engaging members away from contact therewith. In one embodiment, a push-pull cable of known design is used, comprising a substantially flexible outer sheath surrounding and spaced from a substantially flexible wire. However, it will be appreciated that other configurations are possible, such as a flexible wire threaded through a series of eyelets affixed to the wheelchair to interconnect the first and second wheel-engaging members.

In another aspect, the present invention provides a wheel stop for substantially preventing the rotation about an axis of a wheelchair wheel or tire, comprising a mounting bracket, a wheel-engaging member, and an actuating lever operably connected to the wheel-engaging member. The wheel-engaging member includes a wheel-contacting surface having a cutout for grippingly engaging the ground-engaging portion of a resilient wheelchair wheel or tire as described above. The cutout portion may be concave, or any suitable dimensions for providing a space into which material of the resilient ground-engaging portion may protrude.

In yet another aspect, the present invention provides a wheel locking assembly for substantially preventing rotation of a wheelchair wheel or tire about an axis, comprising a first wheel stop and a second wheel stop for mounting to opposite sides of a wheelchair frame. The first wheel stop may comprise a mounting bracket, a first actuating lever operably connected for displacing a first displaceable wheel-engaging member into or away from contact with a first wheel or tire, and a second actuating lever.

The second wheel stop may comprise a mounting bracket and a second displaceable wheel-engaging member operably connected to the second actuating lever as described above. The second actuating lever pivots the second displaceable wheel-engaging member into or away from contact with a second, opposed wheel or tire. As described above, the first and second wheel-engaging members include a wheel-contacting surface having a cutout for grippingly engaging the resilient ground-engaging portion of a wheelchair wheel or tire.

The second displaceable wheel-engaging member may be operably connected to the second actuating lever by a substantially continuously flexible linkage, which may be a push-pull cable as described above. It will be appreciated that this embodiment of the wheel locking assembly of the present invention allows independent locking control of the two primary drive wheels of a wheelchair, while still preserving the advantageous feature of wheelchair wheels lockable using controls located on a single side of the wheelchair. It will also be appreciated this latter embodiment preserves the feature of being able to lock at least one wheel of the wheelchair even if the continuously flexible linkage is severed.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrate several aspects of the present invention and, together with the description, serve to explain the principles of the invention. In the drawing.

Reference will now be made in detail to the presently preferred embodiment of the invention, an example of which is illustrated in the accompanying drawings.

DETAILED DESCRIPTION OF THE INVENTION

Figure 1:
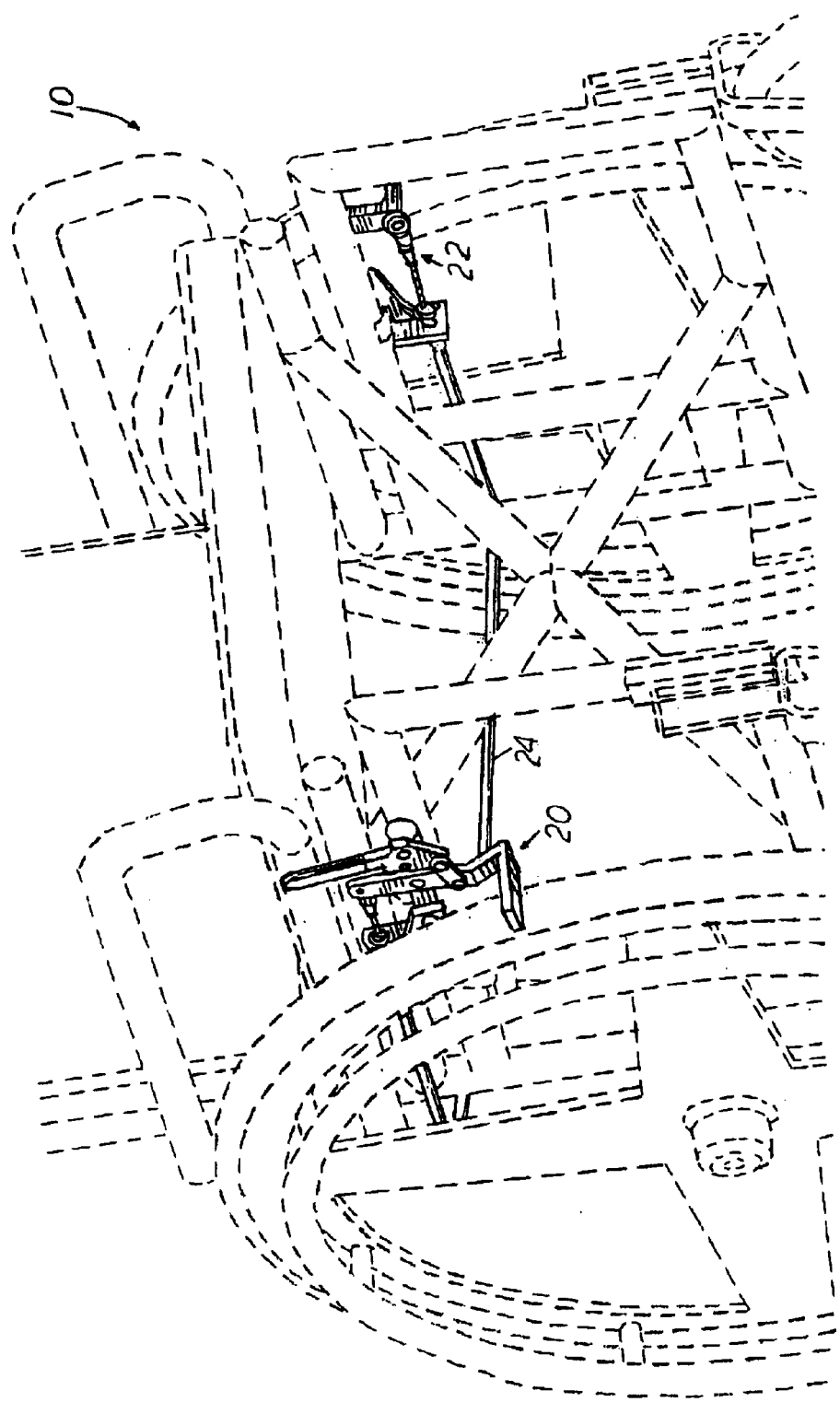
FIG. 1 is a perspective view of the wheel lock assembly of the present invention installed on a conventional wheelchair.

As best seen in FIG. 1 appended hereto, the wheel locking assembly 10 of the present invention may be mounted to a wheelchair (shown in broken lines for convenience) having a frame, a seat and back attached to the frame, and at least two primary drive wheels. Of course, the wheel locking assembly 10 of this invention will be mounted to the wheelchair such that the wheel locks are in spaced relation to the primary drive wheels to allow locking thereof. The wheel locking assembly 10 of the invention may comprise a first wheel stop 20, a second wheel stop 22, and a substantially continuously flexible linkage 24 operably connecting the wheel stops 20, 22. Wheel stops 20, 22 may be fabricated of any suitably durable, corrosion-resistant material commonly used to fabricate wheelchair wheel stops, including but not limited to metals such as aluminum and stainless steel, and suitably durable plastics or polymers.

Figure 2:
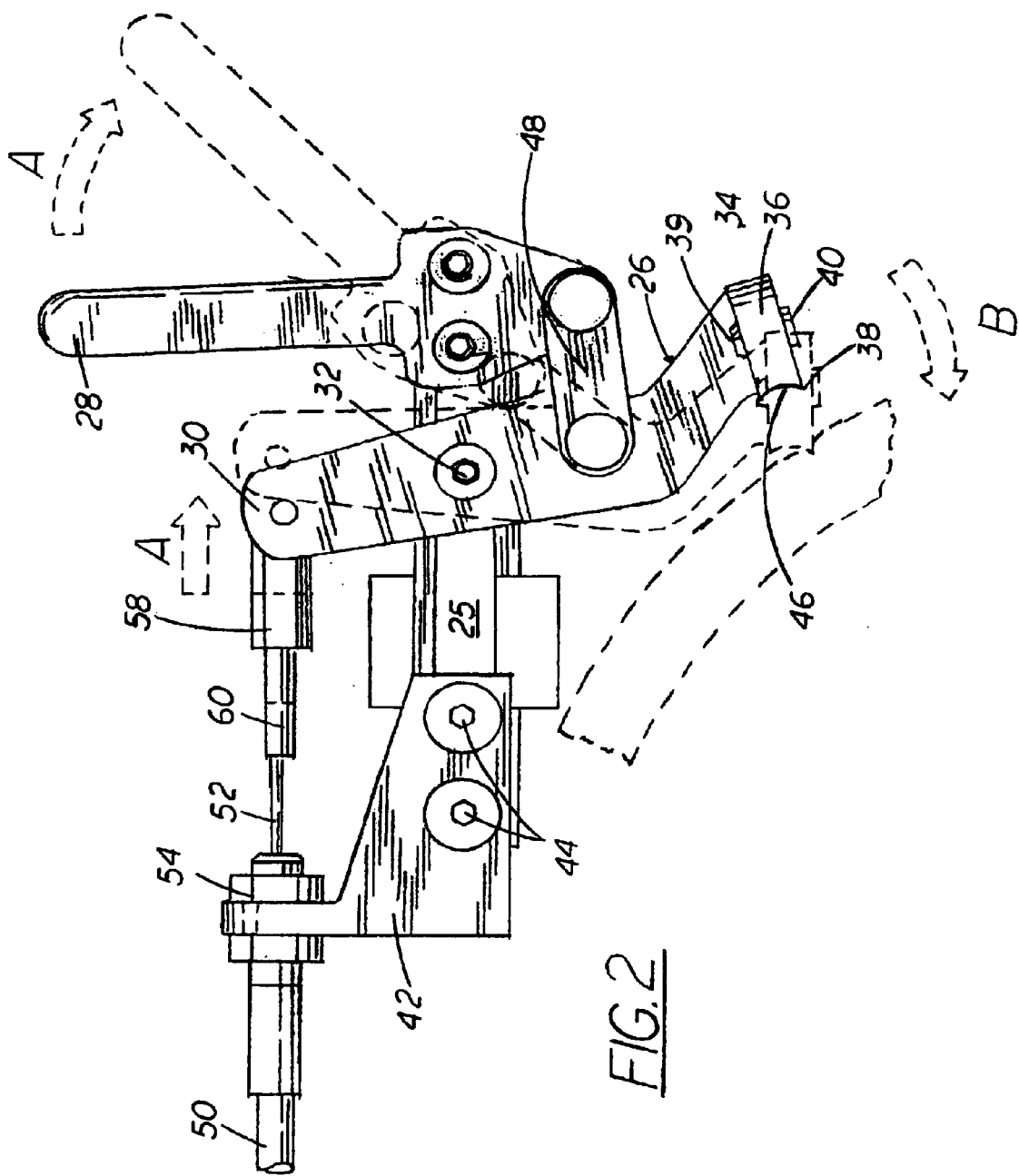
FIG. 2 is a side view of the single-lever first wheel stop of the present invention.

Referring to FIG. 2, the first wheel stop 20 comprises a mounting block or bracket 25 for mounting same to a wheelchair frame, a displaceable wheel-engaging member 26, and an actuating lever 28. It should be appreciated that mounting block or bracket 25 may be fabricated to any desired configuration for mounting to a wheelchair in accordance with the manufacture of the wheelchair frame, such as by threaded nuts and bolts, clamps, and the like. Thus, the wheel locking mechanism 10 of the present invention may be incorporated into the wheelchair during manufacture, or may be retrofitted to any existing manufacture of wheelchair. Mounting block or bracket 25 may also be configured to mount to either side (left or right) of the wheelchair. The advantage of this feature will be described in greater detail below.

The displaceable wheel engaging member 26 includes a top end 30, a central pivot point 32, and a bottom end 34 having a wheel strike 36 with a wheel-contacting surface 38 thereon. It will be appreciated that the wheel-strike 36 may be integral to the wheel-engaging member 26 (see FIG. 4), or may be attached thereto by any desired means, such as a threaded nut 39 and bolt 40. The mounting bracket 25 further includes a support 42 connected thereto, such as by threaded nuts and bolt assemblies 44. It is also possible to fabricate support 42 as an integral member of mounting bracket 25.

Wheel strike 36 includes a wheel-contacting surface 38 having a cutout 46 therein for grippingly engaging the wheelchair wheel or tire. It will be appreciated that the wheel-contacting surface 38 of the present invention partially indents the resilient ground-engaging portion of a wheelchair wheel (shown in phantom for convenience in FIGS. 2 and 3). Advantageously, as the wheel-contacting surface 38 is biased against the ground-engaging portion of the wheel with the desired force, a portion of the resilient material of the ground-engaging portion of the wheel protrudes into the cutout 46, thereby significantly improving the stopping or gripping force on the wheel compared to a conventional wheel lock. The cutout may be of any dimensions suitable for providing a space into which the wheel ground-engaging surface may protrude. In the embodiment shown in FIGS. 2–4, the wheel-contacting surface 38 cutout 46 is substantially concave.

The actuating lever 28 is operably connected to the displaceable wheel-engaging member 26, depicted in FIG. 2 by linkage 48. However, it will be appreciated that other suitable configurations for operably connecting actuating lever 28 to wheel-engaging member 26 are possible. For example, actuating lever 28 may simply be an integral extension of wheel-engaging member 26, extending upwardly from top end 30 thereof. As the actuating lever 28 is biased in the direction of arrow A, linkage 48 displaces the wheel-engaging member 26 about central pivot point 32, whereby wheel-contacting surface 38 is urged in the direction of arrow B to contact the wheelchair wheel (shown in broken lines for convenience).

Figure 3:
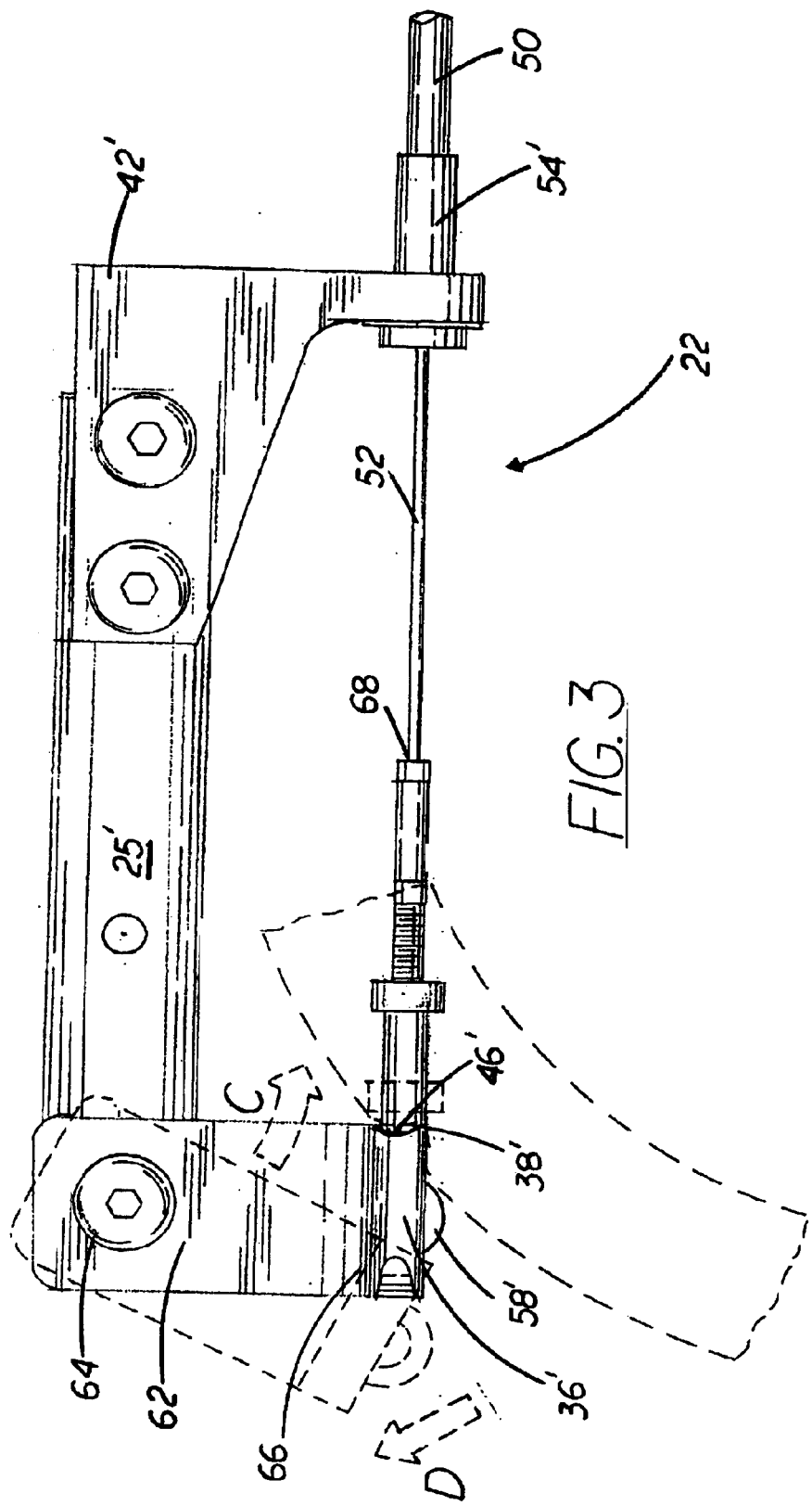
FIG. 3 is a side view of the second wheel stop of the present invention.

Substantially continuously flexible linkage 24 may be connected to support 42 by any suitable means. As shown in FIGS. 2 and 3, substantially continuously flexible linkage 24 may be a push-pull cable of a type known in the art, comprising a hollow sheath 50 surrounding and spaced from a wire 52 slidably inserted in the interior of hollow sheath 50. Hollow sheath 50 may be connected to support 42 by a threaded fitting 54, allowing easy installation, removal, and replacement thereof. It will be appreciated that wire 52 may be fabricated of any suitable material, with only the limitation that it must be sufficiently strong to both pull the wheel stops 20, 22 into contact with the wheelchair wheels with the desired force to prevent rotation of the wheels, and to push the wheel stops 20, 22 away from contact with the wheels to allow free rotation of same.

A first end 56 of wire 52 is connected to top end 30 of wheel engaging member 26, such as by a pivoting fitting 58. A threaded fitting 60 allows tensioning or loosening of wire 52 as desired. It will be appreciated that in accordance with this configuration, when actuating lever 28 is biased in direction A, top end 30 of wheel-engaging member 26 biases wire 52 in the same direction.

As shown in FIG. 3, second wheel stop 22 may comprise a second mounting block or bracket 25', having a support 42' connected thereto. Second wheel stop 22 further includes a second displaceable wheel-engaging member 62, having a first or displaceable end 64 connected to second mounting bracket 25' by any suitable means allowing pivoting thereof, and a second end 66 having a second wheel strike 36' thereon. Second mounting block or bracket 25' may also be configured to mount to either side (left or right) of the wheelchair. Second wheel strike 36' maybe integral with second wheel-engaging member 62, or may be connected thereto by threaded nuts and bolts (not shown). Of course, second wheel strike 36' includes a wheel-engaging surface 38' having a cutout 46' therein.

Flexible linkage 24 connects to second wheel stop 62 at a second end 66 thereof. Hollow sheath 50 is connected to support 42' by any desired means, such as a threaded linkage 54'. Second end 68 of wire 52 is connected to second end 66 of wheel-engaging member 62 by any desired means, such as a pivoting fitting 58'. This allows wire 52 to bias wheel-engaging member 62 in direction C, into contact with a wheelchair wheel, or to push wheel-engaging member 62 in direction D, away from contact with same.

The operation of the wheel locking assembly 10 of the present invention will now be described. The wheel locking assembly 10 is mounted in position on opposed sides of a wheelchair (see FIG. 1) using mounting brackets 25, 25', such that wheel-engaging members 26, 62 may be displaced into contact with the primary drive wheels of the chair. To lock the wheels, actuating lever 28 is biased in direction A. Through linkage 48, first wheel-engaging member 26 pivots to push first wheel-contacting surface 38 into locking contact with a corresponding wheelchair wheel, preventing rotation thereof. As first wheel-contacting surface indents the resilient ground-engaging portion of the wheelchair wheel, a portion thereof protrudes into cutout 46, significantly enhancing the locking ability of the wheel stop 20 without requiring application of any additional force.

Concurrently, top end 30 of first wheel-engaging member 26 is biased in direction A. Impelled by flexible linkage 24, second wheel-engaging member 62 pivots to move second wheel-contacting surface 38' in direction C and into locking contact with the opposed wheelchair wheel. Biasing actuating lever 28 in the opposite direction B simultaneously pulls first wheel-contacting surface 38 away from contact with the corresponding wheelchair wheel, and pushes second wheel-contacting surface 38' away from contact with the opposed wheelchair wheel.

A feature of the wheel locking assembly 10 will become immediately apparent through the above description. When flexible linkage 24 is intact, both wheel stops 20, 22 may be simultaneously operated using a single actuating lever 28 placed on a single side of a wheelchair. Cutouts 46, 46' on wheel-contacting surfaces 38, 38' provide enhanced stopping power without requiring use of increased force, as described in detail above. This provides significant advantages to the user, particularly a user who suffers from greater weakness in a particular hemisphere of the body. By simply mounting the wheel locking assembly 10 of this invention on a wheelchair such that actuating lever 28 is positioned to be accessible to the user's stronger side, whether it be the left or the right side, convenience and effectiveness are enhanced.

In the event that flexible linkage 24 is severed, a further feature of the invention is revealed. Notwithstanding that flexible linkage 24 may have been severed or otherwise damaged, and second wheel stop 22 is rendered unusable thereby, first wheel stop 20 may still be used to lock at least one primary drive wheel of the wheelchair using actuating lever 28. Accordingly, effectiveness of the wheel locking assembly 10 and convenience to the user are further enhanced.

A further advantage is provided by use of flexible linkage 24. Many standard wheelchairs are designed to be collapsed into a narrow configuration for ease of transport and storage. Standard linkages such as connecting rods would deprive the user of the ability to collapse the wheelchair for transport, or in the alternative require removal of the wheel locking assembly 10 prior to collapsing the chair. In contrast, the flexible linkage 24 of the present invention has sufficient flexibility to bend when the wheelchair is collapsed, and to resume its original configuration when the wheelchair is reformed for use. A wheelchair fitted with the wheel locking assembly 10 of the present invention may therefore be collapsed and reformed without need of removal of the wheel stops, thereby increasing convenience and effectiveness for the user and for persons assisting the user.

Figure 4:
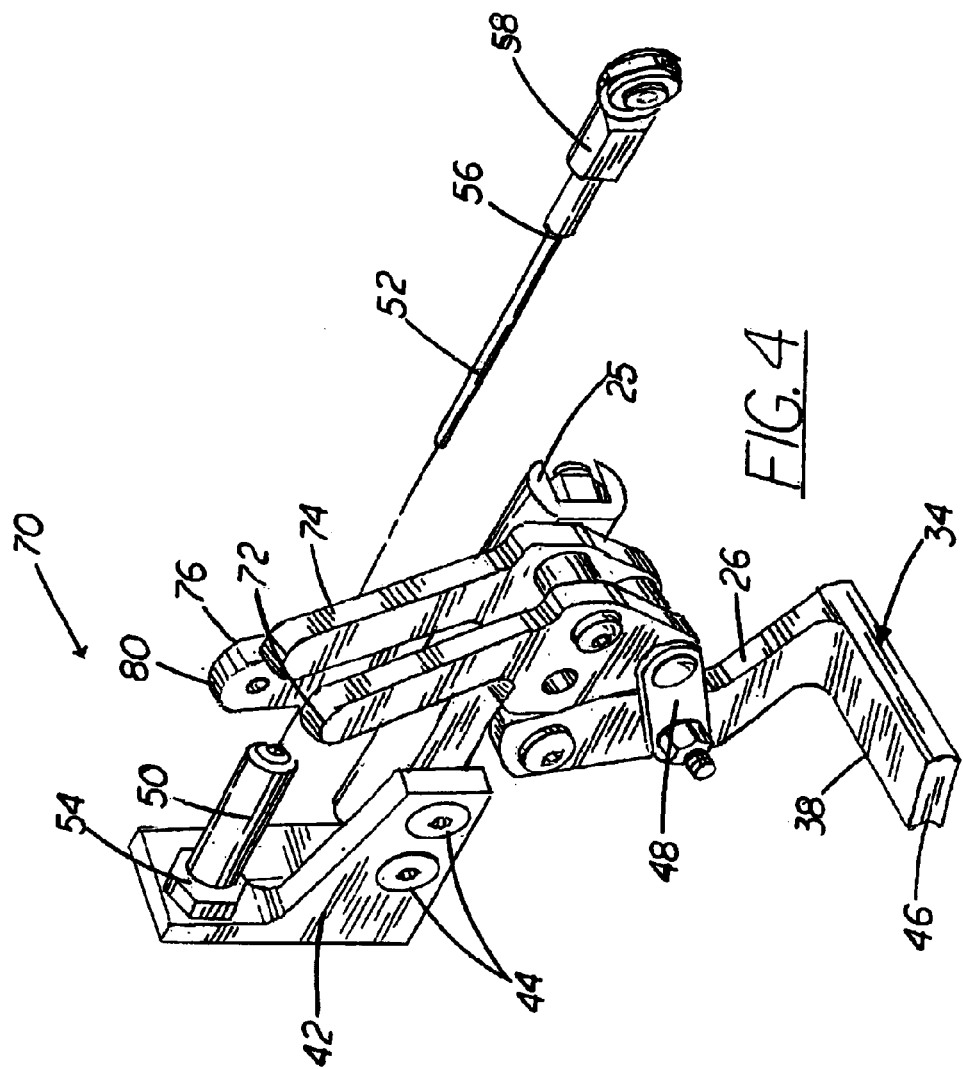
FIG. 4 is a perspective view of the dual-lever wheel stop of the present invention.

Of course, additional configurations of the wheel locking assembly 10 of this invention are possible which preserve the advantageous features thereof as described. Referring now to FIG. 4, a dual-lever wheel stop 70 providing independent control of two wheel-engaging members is shown. Dual-lever wheel stop 70 includes a mounting bracket 25 and support 42 substantially as described above. A displaceable first actuating lever 72 is provided, operably connected to first wheel-engaging member 26 through linkage 48. First actuating lever 72 operates first wheel-engaging member 26 substantially as described above.

A displaceable second actuating lever 74 is also provided, which is operably connected to a rocker arm 76 through a linkage 78. Rocker arm 76 includes a top end 80 adapted to receive a first end 56 of wire 52 of continuously flexible linkage 24 substantially as described above, for example by a pivoting fitting 58 comprising a pin and clip. The opposed end of wire 52 (not shown) is operably connected to second wheel stop 22 (not shown) substantially as described above.

Accordingly, it will be appreciated that control of both wheel stops 70, 22 may be independently effected from a single side of a wheelchair. In the event that flexible linkage 24 is severed, first actuating lever 72 may continue to effect locking of one wheelchair wheel, thus improving the effectiveness of the wheel locking assembly 10 of this invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment described was chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A wheel locking assembly for substantially preventing rotation about an axis of a wheelchair wheel or tire, comprising:
    a first wheel stop and a second wheel stop for mounting to opposite sides of a wheelchair frame:
    said first wheel stop including a mounting bracket, a first displaceable wheel-engaging member, and an actuating lever operably connected to said first displaceable wheel-engaging member; and
    said second wheel stop including a mounting bracket and a second displaceable wheel-engaging member;
    and substantially continuously flexible linkage connecting said second displaceable wheel-engaging member to said first displaceable wheel-engaging member;
    whereby biasing said actuating lever in a first direction pivots the first wheel-engaging member into contact with a first wheel or tire and concurrently pivots the second wheel-engaging member into contact with a second, opposed wheel or tire of said wheelchair, and biasing the actuating lever in a second, opposed direction concurrently pivots the first and second wheel-engaging members away from contact with the first and second wheel or tire.

2. The wheel locking assembly of claim 1, wherein said actuating lever remains operably connected to the first wheel-engaging member if the continuously flexible linkage operably connecting the first and second wheel-engaging members is severed.

3. The wheel locking assembly of claim 1, wherein said wheel-engaging member includes a wheel-contacting surface having a cutout for grippingly engaging a resilient ground-engaging portion of the wheel or tire.

4. The wheel locking assembly of claim 3, wherein said wheel-contacting surface cutout is substantially concave.

5. The wheel locking assembly of claim 1, wherein said substantially continuously flexible linkage comprises a flexible member having a first end operably connected to the first wheel-engaging member and a second end operably connected to the second wheel-engaging member.

6. The wheel locking assembly of claim 5, wherein said continuously flexible linkage is a push-pull cable comprising a substantially flexible outer sheath surrounding and spaced from a substantially flexible wire.

* * * * *